Sept. 20, 1938.　　　W. O. BROWN　　　2,130,610
CITRUS FRUIT JUICE EXTRACTOR
Filed Dec. 2, 1935　　　7 Sheets-Sheet 1

Inventor
William O. Brown

Sept. 20, 1938.　　　W. O. BROWN　　　2,130,610
CITRUS FRUIT JUICE EXTRACTOR
Filed Dec. 2, 1935　　　7 Sheets-Sheet 2

Inventor
William O. Brown

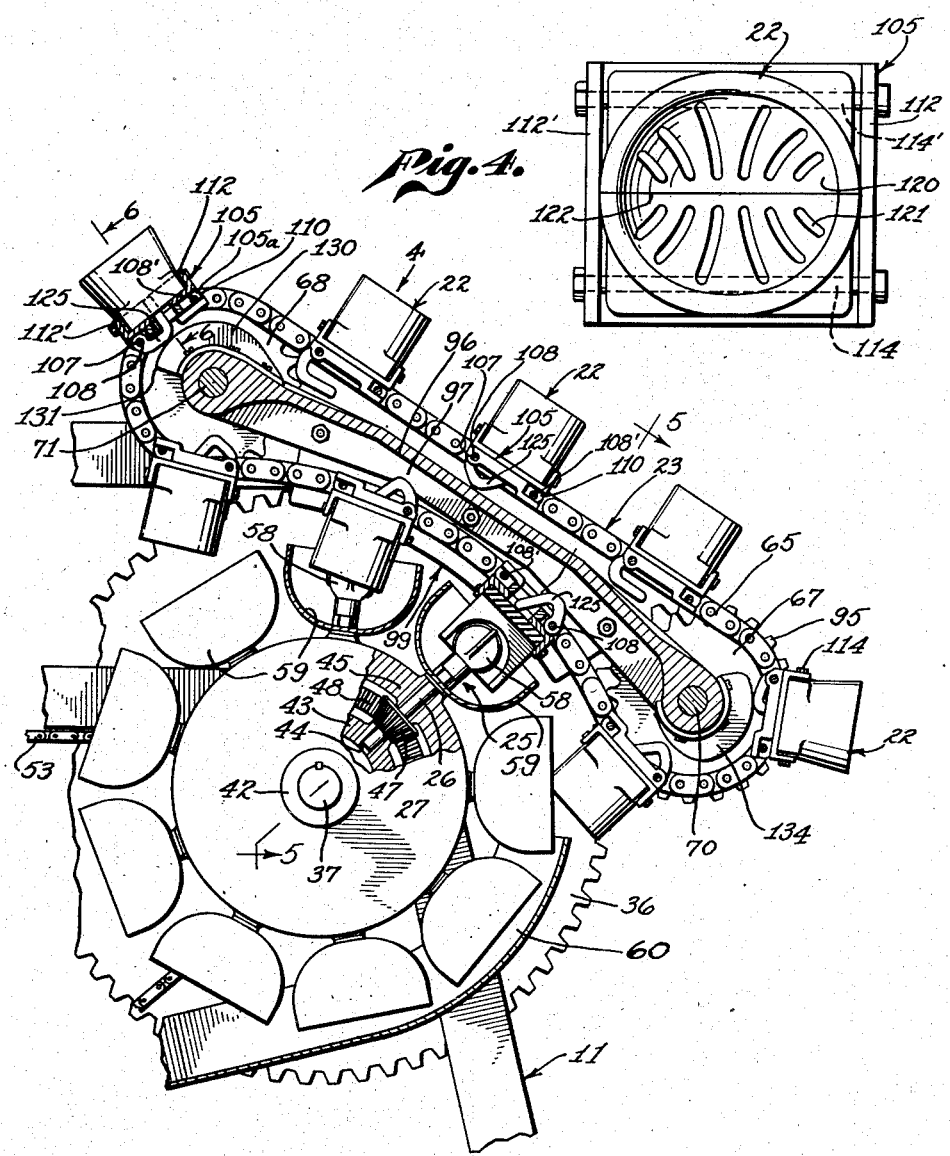

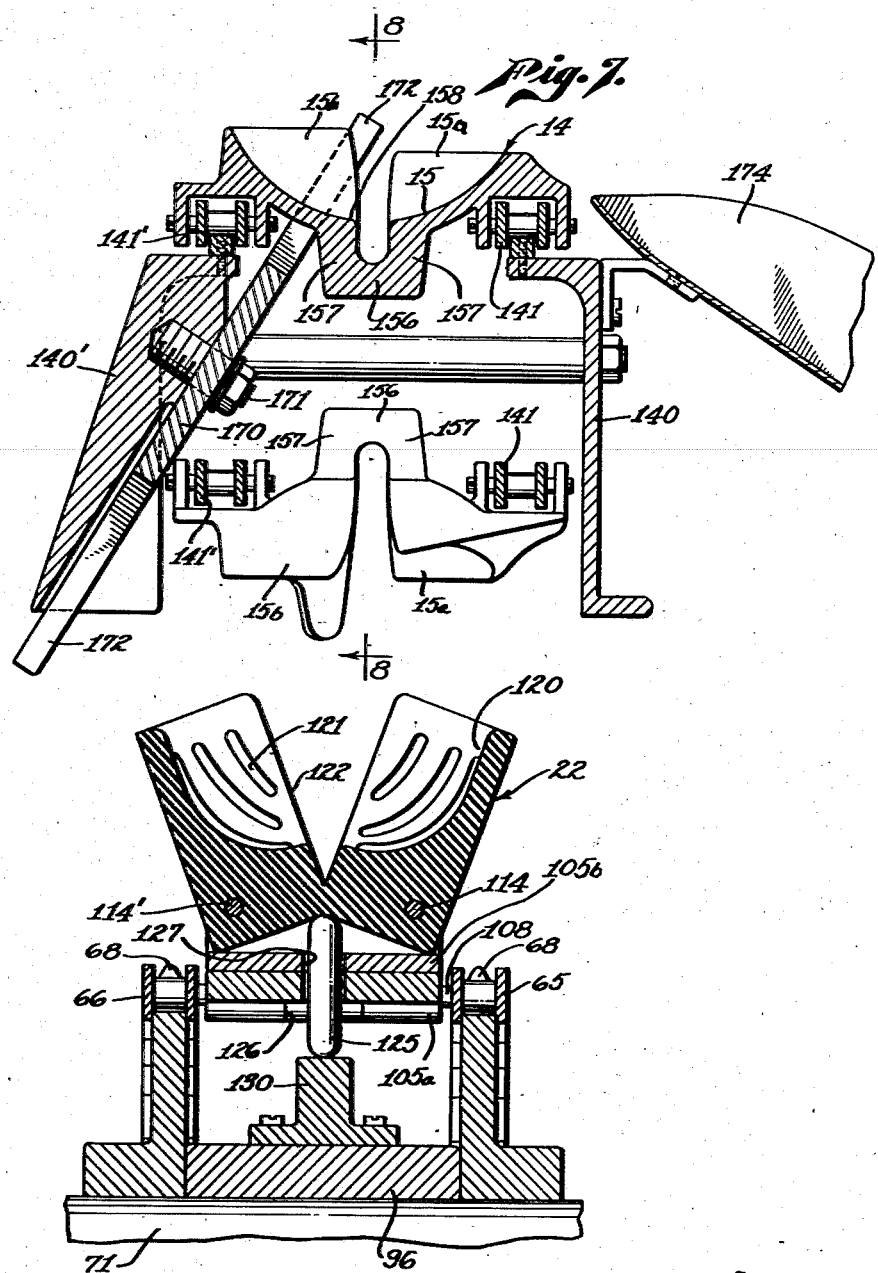

Sept. 20, 1938.　　　W. O. BROWN　　　2,130,610
CITRUS FRUIT JUICE EXTRACTOR
Filed Dec. 2, 1935　　　7 Sheets-Sheet 6
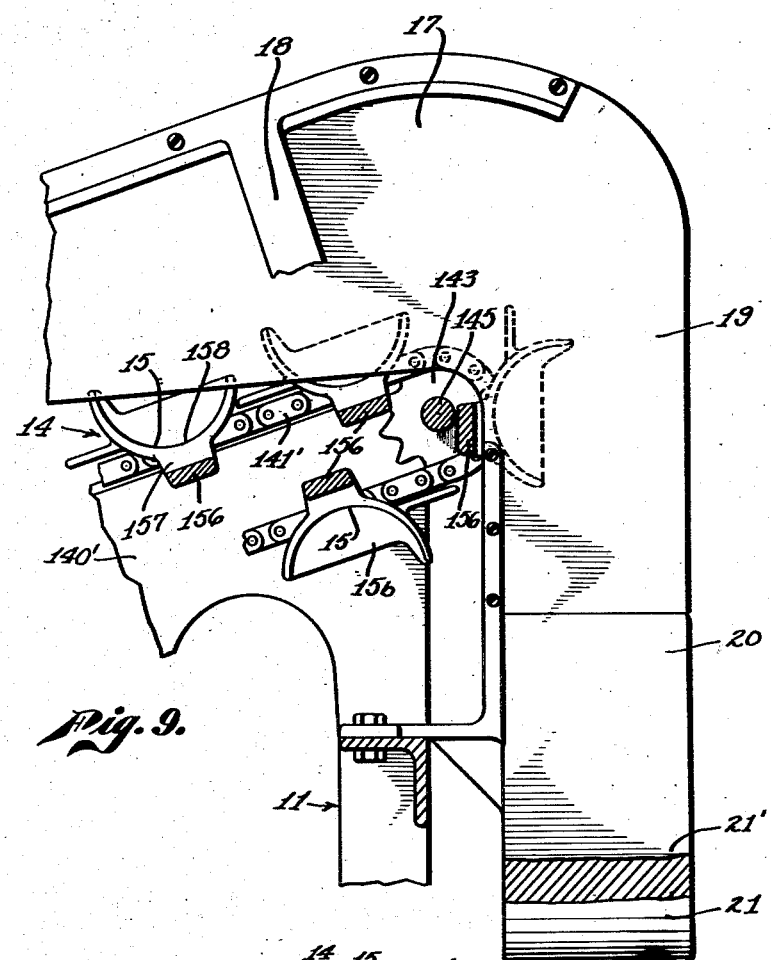
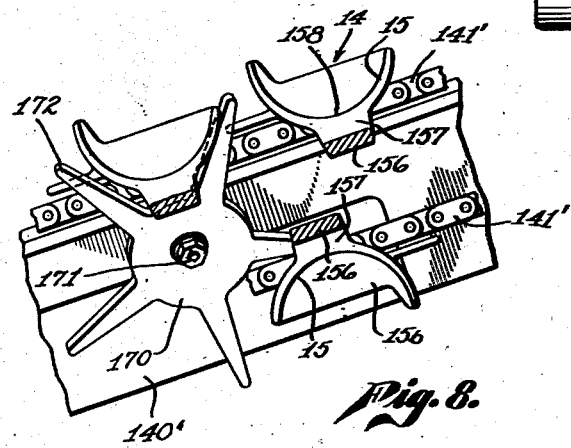
Inventor
William O. Brown
By
Attorney Sept. 20, 1938.  W. O. BROWN  2,130,610
CITRUS FRUIT JUICE EXTRACTOR
Filed Dec. 2, 1935   7 Sheets-Sheet 7

Inventor
William O. Brown
By
Attorney

Patented Sept. 20, 1938

2,130,610

UNITED STATES PATENT OFFICE 2,130,610

CITRUS FRUIT JUICE EXTRACTOR

William O. Brown, North Hollywood, Calif.

Application December 2, 1935, Serial No. 52,551

17 Claims. (Cl. 146—3)

This invention has to do in a general way with fruit juice extractors and is more particularly related to improvements in machines designed for extracting juice from citrus fruits on a commercial scale.

It is a primary object of this invention to produce a machine of the class described which is entirely automatic in its operation and which is effective to slice or halve the fruit and extract the maximum quantity of juice therefrom with the minimum amount of contamination of the juice with tough fibers of the skin or peel.

Pursuant to this general objective, my invention contemplates novel carrying means for supporting the fruit during the reaming or squeezing operation, such means being designed to give a maximum period of contact between the fruit and the reaming element.

It is a further object of this invention to provide for use in a machine of the class described an improved carrying cup or receptacle for supporting the fruit section, such receptacle being of segmental or hinged construction is adapted to be automatically opened and closed to receive and retain fruit sections therein during the reaming operation and to discharge the peel after the juice has been extracted.

The cup and carrying member contemplated by this invention has the further advantage of being able to pick the halves of fruit sections directly from the slicing blade which reduces to a minimum the amount of handling of the sliced fruit and consequently materially reduces juice losses, my invention therefore further contemplates the combination of a carrying member embodying receptacles of the class described, associated with a slicing blade in a manner such that the sliced sections are picked directly from the blade.

In this connection it is a further object of this invention to provide in a general combination of the class described improved means for slicing the fruit, such means incorporating a conveyor which operates in synchronized relation with the carrying cups and the reaming member and further incorporating means for positively preventing the cutting of any of the fruit except those which are being conveyed in synchronized relation with the carrying cups.

Still another object of this invention is to provide a machine of the class described which includes novel means for handling the juice extracted from the fruit, such means being designed to prevent the juice contacting the bearings or other moving parts in the operating mechanism of the reaming element.

The details in the construction of a preferred embodiment of my invention together with other objects attending its production will be best understood from the following description of the accompanying drawings which are chosen for illustrative purposes only and in which:

Fig. 3 is an enlarged fragmentary front elevation with parts broken away illustrating details in the construction in a fruit carrying and juice extracting mechanism contemplated by this invention;

Fig. 4 is a plan view which may be considered as having been taken in the direction of the arrow 4 of Fig. 3 and which illustrates the details in the construction of a preferred form of carrying cup contemplated by this invention;

Fig. 6 is an enlarged sectional elevation which may be considered as having been taken in a plane represented by the line 6—6 of Fig. 3 and which illustrates further details in the construction and operation of the fruit carrying cup contemplated by this invention;

Fig. 7 is an enlarged fragmentary sectional elevation taken in a plane represented by the line 7—7 of Fig. 2;

Fig. 8 is an enlarged sectional elevation taken in a plane represented by the line 8—8 of Fig. 7;

Fig. 9 is an enlarged fragmentary sectional elevation taken in a plane represented by the line 9—9 of Fig. 1;

Figure 1:
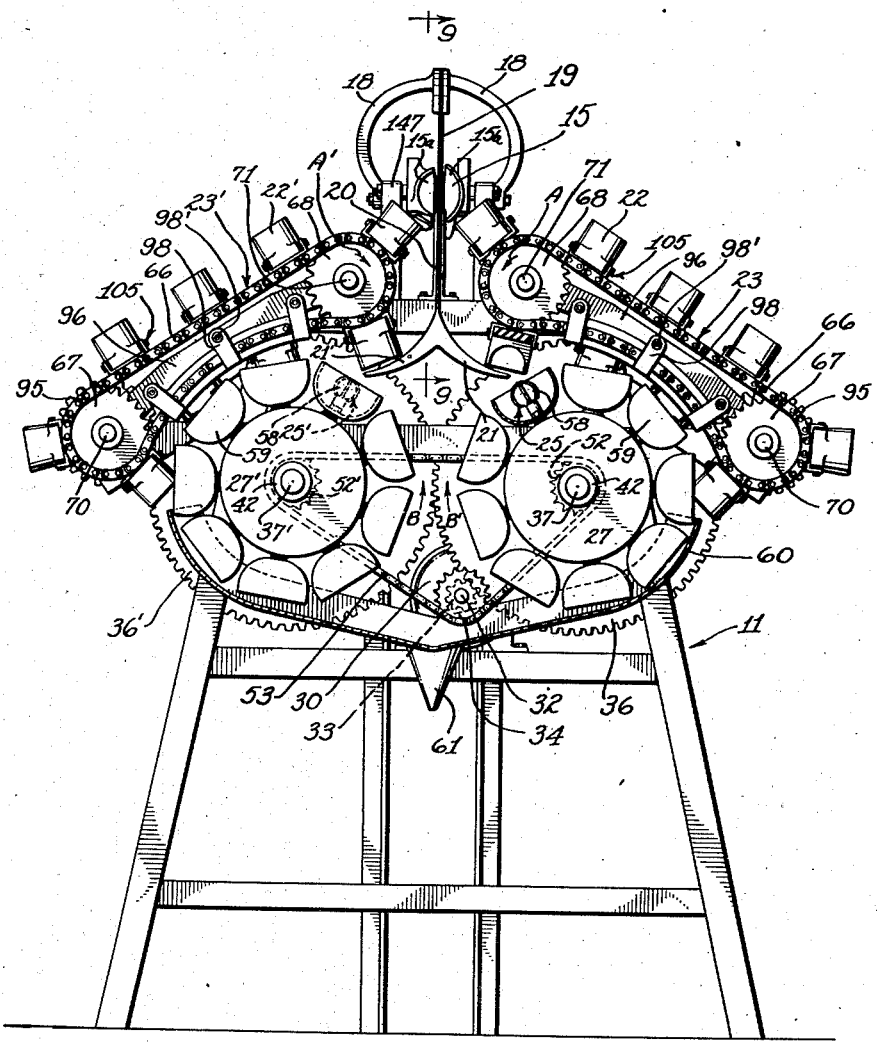
Fig. 1 is a front elevation of a preferred embodiment of my invention.
Figure 2:
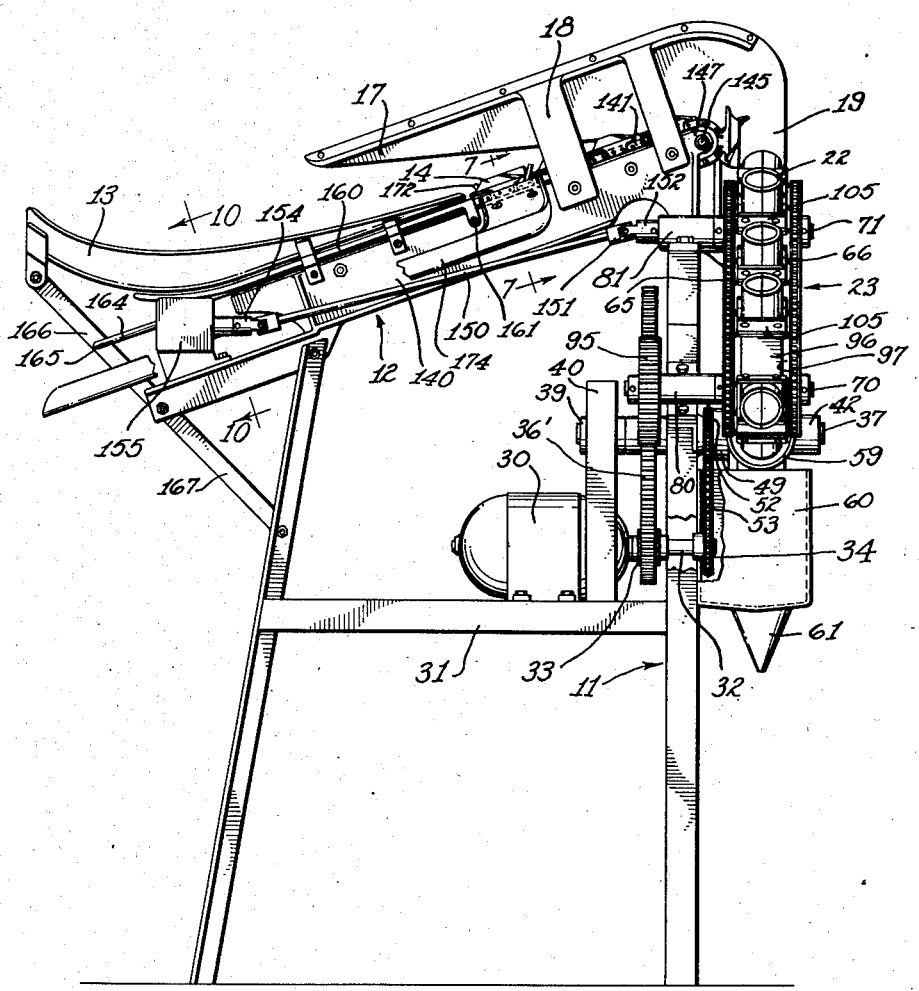
Fig. 2 is a side elevation of the machine shown in Fig. 1.

Referring now to Figs. 1 and 2 of the drawings, I will first describe the general construction and operation of the machine contemplated by this invention, after which I will discuss the details in the construction and operation of the different elements which go to make up the combination.

Reference numeral 11 indicates a frame which has a rearwardly inclined superstructure 12. At the rear portion of the superstructure 12 I provide a curved hopper 13 into which fruit is adapted to be delivered from any suitable source, and from which the fruit is adapted to be individually conducted through the medium of a conveyor member generally indicated by reference numeral 14 which travels through the bottom portion of the hopper.

This conveyor member 14 is equipped with a plurality of pocket pieces 15 which are shaped so as to carry an individual fruit and the conveyor is operated so that the fruit is drawn upwardly along the incline of the superstructure beneath the lower inclined edge of a vertical blade member 17. The blade member 17 is supported on top of the superstructure 12 through the medium of brackets or braces 18, the cutting edge of the blade being so correlated with the path of the cups that by the time the conveyor reaches a point at which it turns for the return lap in its course, the fruit has been completely cut in half.

It will be observed from Fig. 2 that the blade 17 has a forwardly and downwardly extending nose 19 along which the halves or sections of fruit travel toward a dividing plate 20 which is best illustrated in Fig. 1. This dividing plate terminates at its lower end in a pair of outwardly flared plates 21 and 21'.

As the fruit sections are conducted downwardly along the nose portion 19 of the blade on to the dividing plate 20, the pockets which have carried the fruit sections to this point start rearwardly on the return portion of their course of travel and immediately as these pockets start to leave the fruit on the blade or dividing plate, the cut fruit sections are picked up by cups or receptacles 22 and 22' which are mounted on the carrying units 23 and 23' positioned on opposite sides of the blade and carrying plate.

The carrying units 23 and 23' are arranged so that the course of travel of the cups 22 and 22' thereon move in paths which are tangent to the blade and dividing plate, and the carrying unit and conveyor above referred to are operated in synchronism so that the cups and pockets approach each other on the blade or dividing plate in timed relation with each other and in a manner such that the fruit sections deposited on the blade by the pockets are picked up immediately by the cups. The region at which the cups receive the fruit sections from the blade will be hereinafter referred to as the "delivery region".

It is an important feature of this invention that the cups on the carrying members 23 and 23' are of a segmental or hinged construction so that they can be opened and closed upon the fruit sections and opened again to discharge the peel therefrom, also that the carrying units are made of a flexible nature so that by means of suitable guides they can be shaped to follow any predetermined course to give the desired reaming action within the fruit sections. The details in these structures, however, will be described more completely later in the specification. Suffice it to say at this time, that the carrying members or units are operated so as to move the cups in the general direction of the arrows A and A' in Fig. 1 and as the cups leave the dividing plates 21 and 21', they move into juxtaposed relation with reaming members generally indicated by reference numerals 25 and 25'.

These reaming members in this form of my invention consist of radially disposed spindles 26 which are mounted in wheels 27, the wheels being operated in synchronism with the carrying members 23 and 23' and arranged so that the spindles enter and leave the cups to squeeze the juice from the fruit contained therein as the cups are conducted along the lower course of their travel by the carrying members 23 and 23'. As the cups and reaming members separate from each other, the cups contain merely the peel of the fruit and at a point beyond the region of separation between the cups and the reaming members and the "delivery region" in the path of the cups they are opened to discharge the peel therefrom. The region in this path or course of travel at which the cups are opened to discharge the peel will hereinafter be referred to as the "discharge region".

Reference will now be made to Figs. 1 to 6 inclusive for a more detailed description of the carrying and reaming units together with the driving mechanism therefor.

Reference numeral 30 indicates a motor or other suitable source of power which is mounted upon a cross frame 31 in the main frame structure 11. The motor 30 is provided with a drive shaft 32 to which a pinion gear 33 and a sprocket wheel 34 are keyed.

As is best illustrated in Figs. 1 and 2, the pinion gear 33 is in mesh with a large gear 36 which in turn is in mesh with an identical gear 36', such gears being used to drive the reaming wheel, will be referred to as reaming wheel drive gears. The reaming wheel drive gears 36 and 36' are keyed to shafts 37 and 37' which in turn are journaled in bearings 38 and 39 mounted in the front portion of the main frame 11 and in an upright auxiliary frame 40 respectively. These shafts 37 and 37' extend forwardly of the main frame 11 a substantial distance so as to provide a support for the wheels 27 and 27', such wheels being provided with hubs 42 which are keyed to the forwardly extending ends of the shafts.

Figure 5:
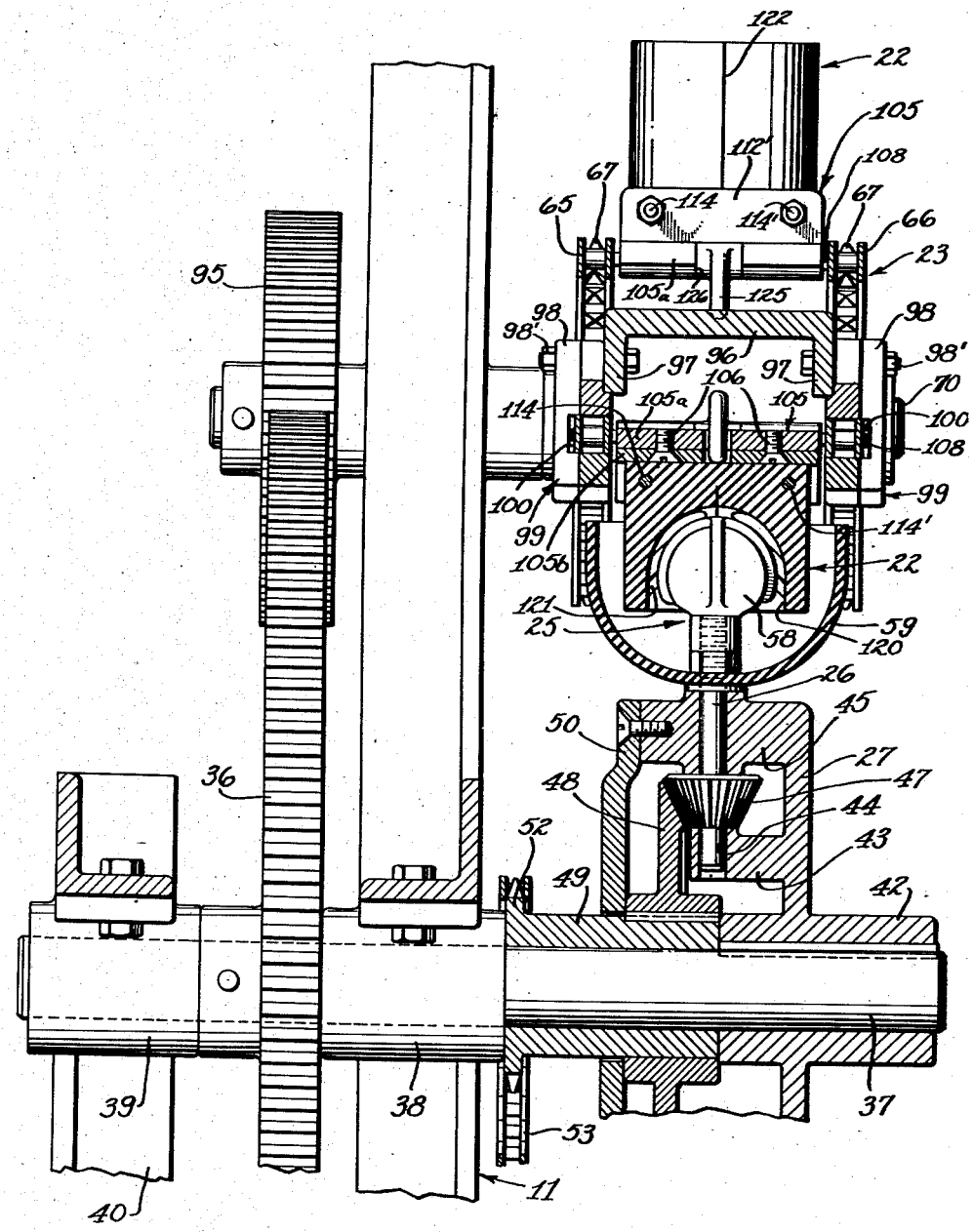
Fig. 5 is an enlarged sectional elevation which may be considered as having been taken in a plane represented by the line 5—5 of Fig. 3.
Figure 11:
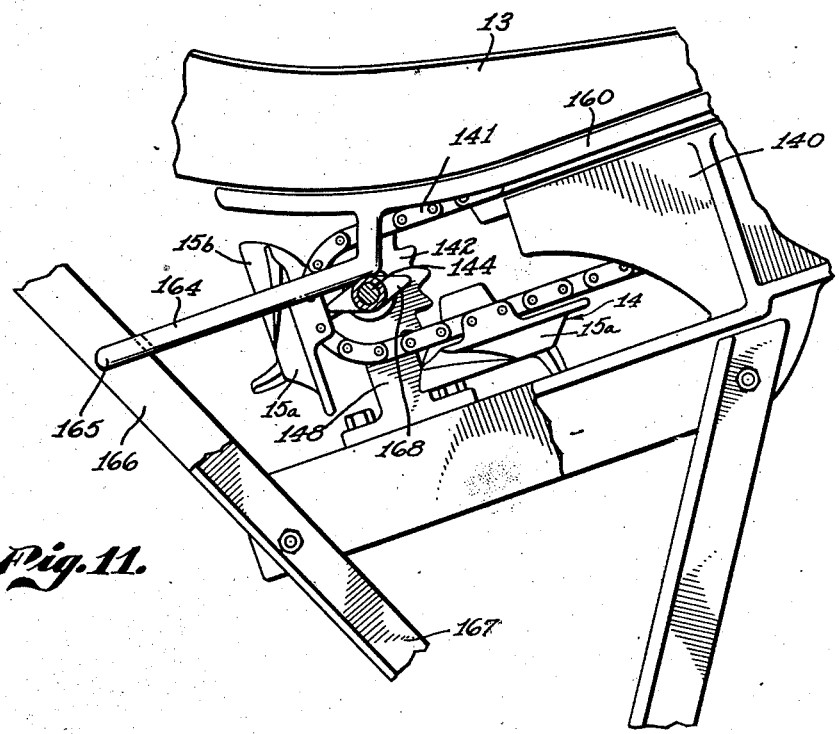
Fig. 11 is a sectional elevation taken along the line 11—11 of Fig. 10.

As will appear from Fig. 5, the wheels 27 and 27' are made of hollow construction and each is formed with an inwardly extending annular flange 43 which is provided with bearing openings 44 such openings constituting the support for the inner ends of the reaming spindles 26. The portion of the spindle 26 between the flange 43 and the main flange 45 of the wheel 27 is provided with a beveled pinion 47 which is in mesh with a beveled gear 48 such gear being keyed to a sleeve 49 which is rotatably mounted upon the shaft 37. The wheel is shown as being provided with a cover plate 50.

The sleeves 49 on the two shafts 37 and 37' are formed with sprocket wheels 52 and 52' on their inner ends, such sprocket wheels being engaged by a sprocket chain 53 which is driven from the sprocket wheel 34 on the end of the main drive shaft 32. It will thus be seen that the large gears 36 and 36' make for a material reduction in speed between the main drive shaft 32 and the reaming wheel drive shaft 37, whereas the sleeve 49 with its associated driving mechanism is effective to operate the beveled pinions 47 and their associated reaming spindles 26 at a relatively high velocity. It will also be seen that since the gears 36 and 36' are the same size and are in mesh with each other they will be rotated in the direction of the arrows B and B' of Fig. 1 at the same angular velocity.

Each of the reaming spindles 26 is provided at its outer end with a burr 58 which is adapted to enter the fruit in the general manner discussed above and extract the juice therefrom. Although various means may be employed to receive and collect the juice so extracted, it is one object of this invention to provide a novel form of juice catching and recovering means which will prevent the juice getting on to the moving parts of the machine and setting up corrosive action in the bearings. This objective is accomplished by rigidly mounting on each of the spindles 26, below the reamer 58, a bowl member 59 which is of substantially greater diameter than the carrying cup 22 and which may be formed of any non-corrosive material.

In the event the machine is to be used for extracting juice from fruit of different sizes such as oranges and grapefruit, I consider it an advantage to make the bowl 59 of a flexible material such as rubber so that the edge of the bowl will snap under the protruding edge of a large fruit section as the cup and bowl approach their juxtaposed relation with each other. For the purpose of receiving the juice from the bowls as they approach their inverted position I provide the frame with a trough member generally indicated by reference numeral 60, such trough member having a drain spout 61 at its midportion from which the juice may be delivered into suitable containers or into a suitable conduit (not shown).

It was previously pointed out as one of the objects of this invention to provide a machine of the class described with a carrying member for supporting the fruit sections during the reaming operation which was constructed and operated in a manner such that a maximum time of contact is obtained between the individual reaming members and the individual fruit sections, the purpose of this construction being to permit the use of reaming burrs with shallow flanges so that the juice is removed with a squeezing rather than a cutting effect. This materially reduces the amount of coarse fibers and pulp in the extracted juice.

I obtain this objective by employing a carrying member of flexible construction which in this form of my invention is shown as comprising a pair of endless sprocket chains 65 and 66 which are carried between two sets or pairs of sprocket wheels 67 and 68 such sets of wheels being mounted in spaced relation with each other on shafts 70 and 71. The shafts 70 and 71 are journaled in bearings 80 and 81 on the frame member as is best illustrated in Fig. 2. It will be understood that there is a set of these shafts for each of the carrying members 23 and 23', such carrying members being identical in construction, the same reference numerals will be used to designate the different parts of each.

The inner end of the lower shaft 70 is provided with a gear 95 which is in mesh with the corresponding gear 36 or 36' depending on which side of the machine the particular shaft 70 is located. In this way it will be seen that the carrying members are driven through the same medium which drives the reaming members so that the carrying members and the reaming wheels operate in synchronized relation with each other.

Mounted between the two shafts 70 and 71 and supported thereon or otherwise supported on the frame structure I provide what may be termed a guide and cam supporting bar generally indicated by reference numeral 96. This bar 96 has depending flanges 97 situated in planes adjacent the planes of the sprocket chains 65 and 66. Secured to each of these flanges 97 through the medium of bosses 98 and bolts 98' are track members indicated generally by reference numeral 99. These track members have grooves or tracks 100 through which the lower runs of the chains 65 and 66 travel in concave relation with the path of the squeezing reamers. In other words, the tracks are shaped along an arc which is tangent to a section of the path traversed by the reaming members 25 as they enter and leave the cups 22. It will be observed that the radius of the arc of the guide is slightly greater than the radius of the path of the reaming members. Also that the center of this arc is offset from the center of said reaming wheel, but for the purpose of description and definition herein, the arc of the track will be referred to as being substantially parallel to a peripheral section of the reaming wheel.

The cups 22 in this form of my invention are carried by what I may term base plates 105. These base plates, as indicated in Fig. 5 are shown as being formed in two sections 105a and 105b, such sections being secured together by means of screws 106. The lowermost section 105a is provided at one end with a longitudinal passage 107 through which a pin 108 extends. The pin 108 has its ends supported by the two chains 65 and 66. The other end of the bottom base plate section 105a is shown as being undercut as indicated at 110 so as to leave a slot for the reception of a similar pin 108' which supports the other end of the base plate member. In this way the base plates are positively supported and moved by the two carrying chains, the slot formed by the undercut 110 accommodating for the arc of the curve through which the carrying member travels in moving over the two sets of sprocket wheels which support the chains.

The top section 105b of the base plate member is provided with vertical flanges 112 and 112' on the ends thereof such flanges being provided with apertures in their sides to receive and support pivot pins 114 and 114' which extend through the base portion of the hinged cups 22.

The construction of this hinged cup constitutes one of the most important features of this invention, it being a primary object thereof to provide a cup which may be readily and automatically opened and closed to permit the reception and clamping of fruit sections therein and also to permit the discharge of fruit peel therefrom. As has been previously indicated the cup is of hinged construction and I prefer to form the same of a resilient material such as rubber.

The preferred form of cup contemplated by this invention consists of a rubber block which is provided with a recess in its upper portion to form a cup indicated by reference numeral 120. The inner surface of this cup may be scored as indicated at 121 and in order to obtain the resilient hinged or segmental construction the cup is split downwardly from its top as indicated at 122 to a point near its bottom the split in this form of my invention being located in a medial plane between the two pivot pins 114 and 114'. In other words the block which forms the segmental cup disclosed herein is pivotally secured to the base plate on opposite sides of the medial plane along which it is split. As indicated in the drawings it is preferable that the split or driving line of the cup be in the plane of travel of the carrying member, although variations in the position of the splits and the number of sections formed thereby may be made without departing from the scope of this invention.

With this construction it will be seen that when pressure is applied to the midportion of the base of the cup between the two axes 114 and 114' on which it is supported the central portion of the block will be raised and during the elevation thereof the two split sections will be spread apart in the manner indicated in Fig. 6 and in order that the cup may be effective to accommodate itself to fruit of various sizes, I prefer to make the cup opening more or less oval or elliptical in cross section as indicated in Fig. 4.

Various types of plunger means may be employed to automatically apply the pressure above referred to to the bottom portion of the cup and in the particular type of carrying unit chosen for purpose of illustration herein, I have found it advantageous to form the plunger member in the nature of a bell crank 125 which as illustrated in Fig. 6 is pivoted in a cutout portion 126 in the base plate on the forward cross pin 108, and is adapted to work through an aperture 127 in the base plate.

As has been previously indicated, it is important that the cup members be successively in an open position as they approach the blade or dividing plate 19 and 20 so as to advance over fruit sections which have been deposited on such blade or dividing plate and also that the cups be permitted to close upon such fruit sections before they leave the dividing plate or its extension 21 or 21'. In view of the resilient character of the cups in this form of my invention, they will automatically close from an open position after the pressure applied to the bottom thereof is released, so it is only necessary to apply pressure to the bottom portion of the cups over that region in their path during which they are to be in open position.

In this form of my invention the actuation of the hinged cups is accomplished by the provision of a stationary cam member 130 which is shown as being mounted upon the end of the bar 96 adjacent the region at which the cups turn and advance toward the blade and dividing plate 19 and 20. The cam 130 is arranged so as to be engaged by the bell finger or bell plunger member 125 forcing the plunger member upwardly to open the cup as it advances to a point at which the synchronized operation of the conveyor member has deposited a fruit section to be picked up. As illustrated in Fig. 1 the path of the cup travels down tangentially with the plate member advancing over such fruit section and moving the same downward along the dividing plate. The face of the cam 130 is, as indicated in Fig. 3 provided with a sharp nose 131 which permits the freedom of the plunger member so that the resiliency of the cup automatically closes the same upon the fruit section before the fruit is carried away from the dividing plate and its associated members 21 and 21'.

As the carrying member continues in its operation the cup carrying the fruit section moves in timed relation with a cooperating spindle on the reaming member so that they are brought into juxtaposed relation with each other, the reamer squeezing the juice from the fruit section contained in the cup and leaving the cup just prior to the point at which the carrying member starts to be carried up over the second set of sprocket wheels which are carried by the shaft 70.

At this point all of the juice has been extracted from the rind and I provide here a second cam member indicated by reference numeral 134 over which the plunger member rides to apply pressure to the bottom of the cup and open the same to discharge the peel therefrom. The cup is then ready for the reception of another fruit section to be extracted. It will be understood from an examination of Fig. 3 that if desired the elevated portion of the cam 134 may be carried clear up to and include the elevated portion of the cam 130 so that the cups remain open until they ride over the nose 131 to close upon the next fruit section. In order to reduce the frictional resistance of the machine to a minimum, however, I prefer to employ two cams as shown in the drawings.

Reference will now be made to Figs. 1, 2 and 9 to 11 inclusive for a more detailed description of the conveyor and cutting mechanism which prepares and delivers the fruit sections for reception in the cups of the carrying member.

The superstructure 12 in this form of my invention is shown as comprising a pair of oppositely disposed plate members 140 and 140'. The conveyor 14 which carries the pocket members 15 consists of two spaced sprocket chains 141 and 141' arranged in endless loops to pass over identical sprocket wheels 142 and 143 which are mounted on shafts 144 and 145 journaled in suitable bearing members 147 and 148 which are in turn supported by the plate members 140 and 140'.

This conveyor assembly is driven in synchronized relation with the carrying units which in turn are operated in synchronized relation with the reaming members through the medium of a shaft 150 which is connected through a universal joint 151 with a projection 152 on the shaft 71. The shaft 150 is connected through a universal joint 154 with a gear box 155 which drives the shaft 144.

Figure 10:
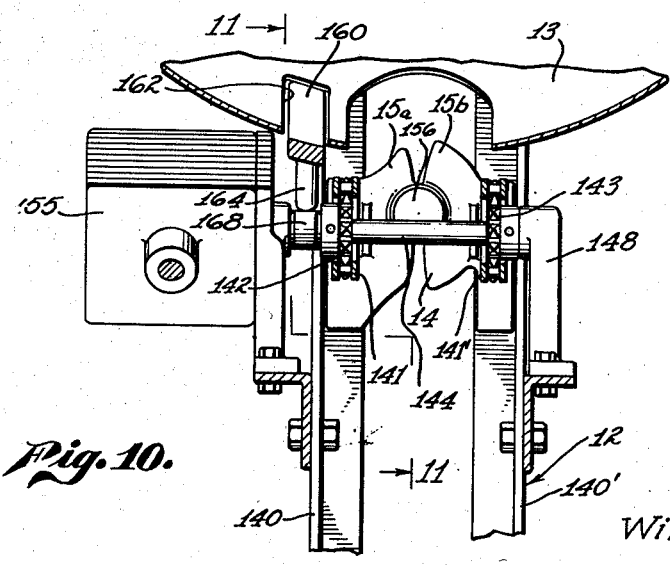
Fig. 10 is an enlarged fragmentary sectional elevation taken in a plane represented by the line 10—10 of Fig. 2.

The pocket members 15 as is best illustrated in Figs. 8 to 10 inclusive are formed in two sections 15a and 15b interconnected by a flange 156 which extends between downwardly extending bosses 157 on the bottoms of the adjacent sections. In other words, these pocket members may be thought of as being divided along a medial line so that the lowermost supporting surface 158 therein will, as the pockets pass along the blade, follow through a plane above the lower edge of the blade. In this way the fruit contained in the pockets is completely sliced in half by the blade member.

One purpose of constructing the superstructure so that the conveyor operates up an inclined plane from the hopper to the blade is to prevent fruit rolling under the blade and being cut before it is properly retained in one of the pockets. In view of this inclined structure, however, it is important that some means for agitating the fruit in the hopper be provided so as to insure the fruit being received in the successive pockets as they travel along through the bottom portion of the hopper. For the purpose of effecting this agitation I provide an agitator bar 160 which is pivoted to the frame as indicated at 161 and which is swung up and down through a slight angle in a slot 162 provided in the bottom of the hopper.

This agitator bar is shown as having a rearwardly extending projection 164 provided with a bifurcated end 165 which works over a projection 166 of a frame brace 167. This last mentioned construction provides a guide for the agitator bar so that it will always work in proper alignment with the slot 162.

For the purpose of effecting the movement of the agitator bar I show the guide arm 164 as extending rearwardly over the shaft 144 and I provide such shaft with a cam member 168 adapted to engage and rock the member 164.

Since there sometimes happens, in the event the hopper 13 is overloaded, that fruit may become lodged on the conveyor member between the successive pockets thereon, and in order to prevent the premature cutting of such fruit, I provide as an additional feature of this machine means for expelling such fruit from the conveyor member before it reaches a position at which it will be engaged by the blade or knife. For the purpose of accomplishing this objective, I mount a star wheel 170 on one of the plates 140' such star wheel being supported on an angularly disposed bearing pin 171. This star wheel has a plurality of elongated fingers 172 which extend into the spaces between the successive cups and which are moved by the cups so as to advance well up into the space therebetween and thereby force any fruit contained between the cups from the conveyor platform. Any fruit so ejected is received in a trough member 174 which discharges into a suitable receptacle or conveyor at the rear of the machine.

It is believed that the operation of the machine is clearly apparent from the general description appearing in the early part of the specification and it is to be understood that while I have herein described and illustrated one preferred embodiment of my invention that the invention is not limited to the precise construction described above, but includes within its scope whatever changes may come within the spirit of the appended claims.

I claim as my invention:

1. In a citrus fruit juice extractor, the combination of: a carrier adapted to travel through a predetermined path; a plurality of cups formed of resilient material and split on opposite sides to form a hinged structure mounted on said carrier; means associated with said carrier for applying pressure to the midportion in the bottom of said cups thereby spreading the sides of said cups to open said hinge structure; means for delivering fruit sections into the path of said cups at one region thereof; means for momentarily actuating said pressure applying means while said cups are in said delivery region to open said cups for the reception of fruit sections therein; means for actuating said pressure applying means at a second spaced point in said path of travel to open said cups and discharge fruit peels therefrom; and reaming means adapted to enter and leave said cups between said delivery and discharge points for extracting juice from fruit sections contained therein.

2. For use in a fruit juice extractor or the like, a carrying member comprising: a block of resilient material having a recess in its top forming a cup; said block being split downwardly from its top to a point near its bottom; means supporting the bottom of said cup on opposite sides of said split; and means for applying pressure to the bottom of said block between said supports to elevate the center of said block with respect to the supported edges thereby opening said cup.

3. For use in a fruit juice extractor or the like, a carrying member comprising: a block of resilient material having a recess in its top forming a cup, said block being split downwardly from its top to a point near its bottom; a base plate forming a support for said block; pivot pins mounted in said base plate and extending through the bottom of said block on opposite sides of said split; and plunger means adapted to work through an opening in said base plate for applying pressure to the bottom of said block between said pivot pins whereby said cup is opened.

4. For use in a fruit juice extractor or the like, a carrying member comprising: a block of resilient material having a recess in its top forming a cup, said block being split downwardly from its top to a point near its bottom; a base plate forming a support for said block; pivot pins mounted in said base plate and extending through the bottom of said block on opposite sides of said split; and a bell finger pivotally mounted on the underside of said base plate and adapted to work through an opening in said base plate for applying pressure to the bottom of said block between said pivot pins whereby said cup is opened.

5. For use in a fruit juice extractor or the like, the combination of: two pairs of sprocket wheels; means supporting said pairs of wheels in spaced relation with each other; two parallel endless chains supported by corresponding wheels in said pairs; a pair of spaced parallel pins having their ends supported in said chains; a base plate having a pivotal connection with one of said pins and a slotted connection with the other of said pins; a block of resilient material having a recess in its top forming a cup, said block being split downwardly from its top to a point near its bottom; means for pivotally securing the bottom of said block to said base plate on opposite sides of said split; plunger means adapted to work through an opening in said base plate for applying pressure to the bottom of said block to open said cup; means for driving said sprocket wheels and said chains; and a cam positioned in the path of travel of said plunger means for imparting a cup opening movement thereto.

6. For use in a fruit juice extractor or the like, the combination of: two pairs of sprocket wheels; means supporting said pairs of wheels in spaced relation with each other; two parallel endless chains supported by corresponding wheels in said pairs; a base plate mounted between said chains; a block of resilient material having a recess in its top forming a cup, said block being split downwardly from its top to a point near its bottom; means for pivotally securing the bottom of said block to said base plate on opposite sides of said split; plunger means adapted to work through an opening in said base plate for applying pressure to the bottom of said block to open said cup; means for driving said sprocket wheels and said chains; and a cam positioned in the path of travel of said plunger means for imparting a cup opening movement thereto.

7. In a citrus fruit juice extractor, the combination of: a carrier adapted to travel through a predetermined path; a plurality of hinged cups mounted on said carrier; means for driving said carrier; means for delivering fruit sections into said cups at one region of said path; means for opening said cups to discharge fruit peels therefrom at a second region of said path, said carrier being arranged and operated so that said cups travel in an inverted position between said delivery and discharge regions; and reaming means adapted to enter and leave said cups while they are in such inverted position for extracting the juice from the fruit sections contained therein, said reaming means comprising a rotatable spindle, a burr on the end of said spindle, and a bowl of greater diameter than said cups rigidly mounted on said spindle and surrounding said burr.

8. In a citrus fruit juice extractor, the combination of: a carrier adapted to travel through a predetermined path; a plurality of hinged cups mounted on said carrier; means for driving said carrier; means for delivering fruit sections into said cups at one region of said path; means for opening said cups to discharge fruit peels therefrom at a second region of said path, said carrier being arranged and operated so that said cups travel in an inverted position between said delivery and discharge regions; and reaming means adapted to enter and leave said cups while they are in such inverted position for extracting the juice from fruit sections contained therein, said reaming means comprising a rotatable spindle, a burr on the end of said spindle, and a bowl formed of flexible material and of greater diameter than said cups rigidly mounted on said spindle and surrounding said burr.

9. In a citrus fruit juice extractor, the combination of: a carrier adapted to travel through a predetermined path; a plurality of hinged cups mounted on said carrier; means for driving said carrier; means for delivering fruit sections into said cups at one region of said path; means for opening said cups to discharge fruit peels therefrom at a second region of said path, said carrier being arranged and operated so that said cups travel in an inverted position between said delivery and discharge regions; and reaming means adapted to enter and leave said cups while they are in such inverted position for extracting the juice from fruit sections contained therein, said reaming means comprising a rotatable spindle; means for movably supporting said spindle, means for driving said spindle support in timed relation with said carrier, means for revolving said spindle, a reaming burr on the end of said spindle, and a bowl of greater diameter than said cup rigidly mounted on said spindle and surrounding said burr.

10. In a citrus fruit juice extractor, the combination of: a wheel; means for supporting said wheel; a plurality of outwardly extending reamers rotatably mounted on said wheel; a flexible carrying member; guide means supporting said carrying member in substantially tangent relation with the path of the reamers on said wheel; a plurality of cups mounted on said carrying member and adapted to contain sections of fruit to be extracted; means for driving said carrying member and said wheel in timed relation with each other; and means for revolving said reamers, the respective cups and reamers being arranged so as to be brought into juxtaposed relation with each other in the region of tangency between said wheel and said carrying member.

11. In a citrus fruit juice extractor the combination of: a wheel; means for supporting said wheel; a plurality of outwardly extending reamers rotatably mounted on said wheel; a flexible carrying member; arcuate guide means supporting a portion of said carrier in substantially parallel relation with a segment of said wheel and in substantially parallel relation with a section of the path of the reamers on said wheel; a plurality of cups mounted on said carrying member and adapted to contain sections of fruit to be extracted; means for driving said carrying member and said wheel in timed relation with each other; and means for revolving said reamers, said cups and said reamers being arranged so that each successive cup is brought into juxtaposed relation with a corresponding reamer in the region of substantial parallel relation between said carrier and said wheel.

12. In a fruit juice extractor, the combination of: a frame; a vertical blade with an inclined lower edge mounted in said frame; conveyor means mounted below said blade in parallel relation therewith; a plurality of pocket members in said conveyor adapted to contain fruit to be halved; said pocket members being so mounted that they are centrally traversed by said blade during operation of the conveyor to thereby halve the fruit; hopper means on said frame for delivering fruit into said pockets; a carrying member mounted in said frame on each side of said blade extending laterally therefrom; cups on said carrying members adapted to pick halved fruit from said blade; means for driving said carrying members; reaming means adapted to enter said cups as they leave said blade for extracting juice from the halved fruit contained therein; and means for operating said conveyor, said carrying members, and said reaming means in synchronized relation with each other.

13. In a fruit juice extractor, the combination of: a frame; a vertical blade with an inclined lower edge mounted in said frame; conveyor means mounted below said blade in parallel relation therewith; a plurality of pocket members in said conveyor adapted to contain fruit to be halved; said pocket members being so mounted that they are centrally traversed by said blade during operation of the conveyor to thereby halve the fruit; hopper means on said frame for delivering fruit into said pockets; a carrying member mounted in said frame on each side of said blade extending laterally therefrom; cups on said carrying members adapted to pick halved fruit from said blade; means for driving said carrying members; reaming means adapted to enter said cups as they leave said blade for extracting juice from the halved fruit contained therein; and means for operating said conveyor, said carrying members, and said reaming means in synchronized relation with each other, said conveyor pockets being divided along a medial line so that the bottom supporting surfaces thereof pass in a plane above the lowermost edge of said blade.

14. In a fruit juice extractor, the combination of: a frame; a vertical blade with an inclined lower edge mounted in said frame; conveyor means mounted below said blade in parallel relation therewith; a plurality of pocket members in said conveyor adapted to contain fruit to be halved; said pocket members being so mounted that they are centrally traversed by said blade during operation of the conveyor to thereby halve the fruit; hopper means on said frame for delivering fruit into said pockets; a carrying member mounted in said frame on each side of said blade; cups on said carrying members adapted to pick halved fruit from said blade; reaming means adapted to enter said cups as they leave said blade for extracting juice from the halved fruit contained therein; means for operating said conveyor, said carrying members, and said reaming means in synchronized relation with each other and a star wheel mounted in said frame adjacent said conveyor and having projections adapted to move into the successive spaces along said conveyor between said pockets for dislodging fruit supported outside of said pockets.

15. In a fruit juice extractor: a carrier provided with receptacles adapted to receive and support fruit; a series of revoluble members adapted to enter said receptacles to squeeze the juice from fruit positioned therein; means for supporting and moving said revoluble members in a circular path; and means for supporting said carrier so that a portion of its path of travel bears a substantially parallel relation to a section of the path of said revoluble members.

16. In a fruit juice extractor: a carrier provided with receptacles adapted to receive and support fruit; a plurality of reamers adapted to enter said receptacles to extract juice from the fruit positioned therein; means for supporting and moving said reamers in a circular path; and means for supporting said carrier so that a portion of its path of travel is on an arcuate portion of a circle having its center on the same side of the carrier as the reamers are located.

17. In a fruit juice extractor: a flexible carrier provided with receptacles adapted to receive and support fruit; a plurality of reamers adapted to enter said receptacles to extract juice from fruit positioned therein; means for supporting and moving said reamers in a circular path; and means for supporting said carrier so that a portion of its path of travel is on a curve which partially encompasses the circular path through which the reamers travel.

WILLIAM O. BROWN.